United States Patent [19]

Bonneton et al.

[11] Patent Number: 4,678,390

[45] Date of Patent: Jul. 7, 1987

[54] AUTOMATED SELF-POWERED MATERIAL HANDLING TRUCK

[75] Inventors: Marc Bonneton, Tourcoing; Dominique Janvier, Lille, both of France

[73] Assignee: Societe Anonyme REDOUTE CATALOGUE, Roubaix, France

[21] Appl. No.: 844,455

[22] Filed: Mar. 26, 1986

Related U.S. Application Data

[63] Continuation-in-part of Ser. No. 652,348, Sep. 19, 1986, abandoned.

[51] Int. Cl.$^4$ .............................................. B65G 1/06
[52] U.S. Cl. .................................. 414/282; 414/280; 414/286; 414/416; 414/785; 414/541; 414/751; 414/626; 414/331; 414/661; 53/551; 53/552; 294/86.4
[58] Field of Search .............. 414/277, 278, 279, 280, 414/281, 282, 283, 286, 416, 541, 732, 729, 679, 730, 751, 752, 736, 737, 626, 618, 785, 331, 661; 53/551, 552; 294/86.4

[56] References Cited

U.S. PATENT DOCUMENTS

| | | | |
|---|---|---|---|
| 3,008,749 | 11/1961 | Gowan | 294/86.4 |
| 3,526,327 | 9/1970 | Atwater | 414/482 |
| 3,661,280 | 5/1972 | Atwater | 414/482 |
| 3,715,040 | 2/1973 | Polus et al. | 414/280 X |
| 3,727,778 | 4/1973 | Hollenbach | 414/277 X |
| 3,746,183 | 7/1973 | Stemme | 414/736 |
| 3,782,565 | 1/1974 | Doran et al. | 414/281 X |
| 3,802,580 | 4/1974 | Castaldi | 414/280 X |
| 3,964,577 | 6/1976 | Bengtsson | 414/280 X |
| 3,978,995 | 9/1976 | Zollinger et al. | 414/279 |
| 4,362,454 | 12/1982 | Kripzak | 414/280 |

FOREIGN PATENT DOCUMENTS

| | | | |
|---|---|---|---|
| 140445 | 3/1980 | German Democratic Rep. | 414/281 |
| 703068 | 4/1966 | Italy | 414/279 |
| 1207146 | 9/1970 | United Kingdom | 414/279 |
| 2056940 | 3/1981 | United Kingdom | 53/551 |
| 2080265 | 2/1982 | United Kingdom | 414/284 |
| 738867 | 6/1980 | U.S.S.R. | 294/86.4 |

*Primary Examiner*—Frank E. Werner
*Attorney, Agent, or Firm*—Robert E. Burns; Emmanual J. Lobato

[57] ABSTRACT

An automated handling system intended notably for storehouses in which miscellaneous articles are kept, for allowing either the restocking of the storehouse, or the regrouping of articles picked up in the storehouse for constituting lots or articles which correspond to a customer's order. The system comprises a central control and management computer and one or a plurality of self-powered trucks adapted to handle stock bins and order receiving bins in the storehouse, and to pick up articles from the bins to constitute lots of articles and gather the various customers' orders. Each self-powered truck comprises a motorized chassis adapted to travel along fixed lanes of the storehouse along storage racks, an inboard computer in data relationship with the central computer, an inboard store structure for receiving the articles concerning the orders thus gathered, a bin receiving platform, an extractor for drawing the bins out from the racks, an optical system for recentering the platform in front of the bins contained in the racks, and grippers adapted to pick up one of the articles contained in the stock bins.

15 Claims, 17 Drawing Figures

AUTOMATED SELF-POWERED MATERIAL HANDLING TRUCK

This application constitutes a continuation in part of the U.S. patent application Ser. No. 652,348 filed on Sept. 19, 1986 and now forsaken.

BACKGROUND OF THE INVENTION

1. Field of the Invention

This invention relates to an automated or robotised material handling equipment intended more particularly for storehouses in which miscellaneous articles or products are stored, this equipment being suitable for either restocking, or re-assembling articles picked up in the storehouse for constituting groups of articles corresponding to a predetermined or preselected order.

This invention is applicable more particularly but not exclusively in the storage premises of the type existing notably in mail-order stores of the kind offering for sale to their customers a great number of articles of many different types which are subsequently grouped and then dispatched as a function of the specific order received from each customer. However, other applications may be contemplated, for instance in the storage of textile articles or other products.

2. The Prior Art

At the present time it is known to store a great number of articles in shops by using racks or like receptacles disposed in rows along the shop's lanes, each rack receiving unitary storage bins containing the objects or articles to be stored.

Usually, storehousemen must move about in the store for picking up one or more articles from the various storage bins.

According to the kind of articles to be handled, these articles can be picked up with the assistance of fork lift trucks driven by the storehouseman along the lanes, the truck handling the bins filled with articles.

Then, the necessary articles must be pick up from the bins at a re-grouping station from which the articles are directed to a dispatching station or department whereat the orders of each customer are regrouped and shipped.

This nearly manual method involves a great number of manual handling operations and becomes rapidly restricted to relatively small stores having a relatively small number of different articles to be managed at a moderate recurrence rate.

In fact, when the number of articles kept in stock and the number of handling operations are high, the necessary staff increases considerably, and each operator must dispose of adequate material handling means and furthermore have a clear knowledge of the position of each article in the store. Now this will obviously reduce the efficiency of the system and the rate of dispatching, while increasing abnormally the cost of each dispatched article on account of the excessive cost of handling operations.

It is for this reason that certain business companies decided in recent times to use manually operated trucks of particular design, which are adapted to travel along a shop lane lined with racks. These trucks comprise as a rule a frame guided by an under-the-floor or overhead rail, and a lift platform from which the warehouseman can control the handling operations. In addition, to avoid to and fro movements under certain circumstances a plurality of bins can be placed on this platform for regrouping several orders without moving several times along the store lane.

Notwithstanding certain advantageous features in comparison with the manual handling system, these trucks are attended by many inconveniences, such as requiring an operator for driving each manual truck, the necessity for the operators to have a complete knowledge of the store, and assigning a predetermined lane to a given truck. Under these conditions, the handling of goods in the storehouse lacks flexibility and gives rise to serious inconveniences from the dual point of view of efficiency and cost.

To improve the above-described manual trucks, certain manufacturers have introduced automatic control means for controlling the handling operations according to a predetermined program.

With power trucks of this type it is possible to locate and approach a bin containing for example spare parts at a well-defined location of the racks concerned, whereafter, to avoid jammings the thus picked up bins are deposited by the truck in a central lane extending across the lanes along which the truck is caused to travel, said central lane comprising as a rule endless belt convreyors so that the articles can easily be directed to a regrouping station.

Obviously, with these considerably improved transfer and storage systems the handling operations can be eased in certain cases without being entirely satisfactory, for various reasons.

More particularly, these transfer means are adapted as a rule to handle only one reference article at a time, for example by complete pallets or bins loaded with several objects. They are not capable, under any circumstance, to pick up separately one of the objects disposed on said pallet or in said bin.

Moreover, only a few material handling storage systems are provided with means for temporarily storing goods thereon, because the bins, pallets and articles to be transferred are generally bulky and heavy. Therefore, each truck must make several shuttle movements during its operation, thus increasing detrimentally the time necessary for carrying out the material handling cycle.

Another important drawback observed with the above-mentioned known truck systems lies in the fact that they are fixed and must compulsorily serve a single and predetermined lane in the store. In fact, these known transfer and storage means comprise a truck guided on the floor by rolling on one or more rails parallel to and spaced from the shelving or racks.

Now, in case of failure of the goods transfer system, the complete storehouse is held up because the stuck truck will prevent the passage of a break-down repair truck, if any, inasmuch as the implementation of this repair truck would be problematical owing to the necessity of providing a dual electric system.

In addition, it is also worth pointing out that, due to the rigidity of the material handling systems, a store robotised by using goods handling trucks is designed for operation at a predetermined rate that cannot be changed as a function of the number of orders to be dealt with. Therefore, in certain industries where the turn-round is either below, or above, an average rate due to a decrease or an increment in the number or orders to be executed, exploiting a known automated material handling system is neither adequate nor advantageous.

SUMMARY OF THE INVENTION

It is the primary object of the present invention to provide an automated material handling system for storehouses or like commercial premises in which miscellaneous articles or products, such as commercial items, spare parts, etc. are stored, with a view to operate the shop under fully automatic conditions.

With the automated material handling system according to the present invention two essential functions required in the management of a stock are performed, namely:

picking up complete bins of articles stored in the racks of the storehouse, notably for restocking the storehouse automatically, picking up articles separately from the bins previously filled completely with the articles, and subsequently sorting the orders concerning several different articles.

It is a specific object of the present invention to provide an automated material handling system comprising one or a plurality of self-powered material handling trucks managed and controlled from a central management computer adapted to process several orders simultaneously so as to minimize the number of manual operations and consequently of operators necessary therefor.

In addition, in case of need an automated self-powered material handling truck according to the handling system of the present invention may fulfil simultaneously several orders and pick up for restocking purpose different articles from the stock, in order to minimize the handling time by reducing the runs.

It is another object of the present invention to provide an automated material handling system comprising a plurality of self-powered handling trucks adapted to be operated in harmony with one another in the storehouse so as to cope with all momentary requirements. Thus, a modular handling system is obtained which is capable not only of coping very easily with variations occurring in the orders to be processed in different time periods but also of adapting itself to small or large commercial units as a function of their specific character.

Furthermore, the present invention is directed to provide an improved automated material handling system utilizing self-powered trucks that are easily interchangeable in case of failure. In fact, no mechanical adaptation of any kind is required for incorporating an additional or spare truck in the system, the only requirements in this case consisting in addressing and initializing this replacement truck from the central computer.

Besides, the automated material handling system of the present invention can be adapted for picking up unitary articles of very different types, these articles being subsequently deposited in bins stowed in modular racks of the store by means of special tools. Thus, this system is adaptable notably to mail order stores having to process a great number of very diversified articles.

Other objects and advantages of the present invention will appear when reading the following description referring to exemplary forms of embodiment given by way of example, not of limitation.

According to the present invention, the automated material handling system operable in a storehouse or other commercial premises containing many different types of articles, for restocking the shop or permitting the regrouping of articles picked up in the storehouse in order to constitute the lots or articles corresponding to each single order, said storehouse comprising shelves made of modular racks, a network of lanes or corridors along which said modular racks are disposed, and a plurality of unitary storage bins containing said articles according to a classification consistent with the types and reference numerals of the articles, said racks consisting essentially of an assembly of justaposed uprights in which said unitary stock bins are disposed and guided in superposed relationship, is characterised by the fact that it comprises essentially:

a central computer for processing automatically the customers' orders in said system;

one or a plurality of self-powered material handling trucks adapted to handle said bins in the storehouse and to pick up articles in the premises for constituting lots of articles and gather said orders.

said self-powered truck comprises essentially:

a powered chassis further comprising drive or translation means for propelling the truck along the lanes of the storehouse past said modular racks;

an inboard computer adapted to communicate interactively with the central computer for controlling the runs and stoppages of the self-powered truck in the storehouse and consequently its movements;

an inboard store structure consisting of a set of columns adapted to receive and hold in superposed relationship a plurality of order receiving bins, said powered chassis comprising essentially:

a bin receiving platform adapted to carry at least one stock bin and/or one order receiving bin, said platform being movable at least for a more or less linear movement either along the storehouse racks or past at least one of said columns of said inboard store structure, bin pick-up means adapted either to move a unitary stock bin between the storehouse racks and said bin receiving platform, or to move an order receiving bin between said inboard store structure and said bin receiving platform, means for recentering the bin receiving platform so as to position accurately in both abscissa and ordinate the pick-up means in front of a bin carried by the storehouse racks, gripping means adapted to pick up an article contained in the storage bin supported by the receiving platform and to deposit this article in an order receiving bin.

The invention will now be described more in detail with reference to the attached drawings.

DESCRIPTION OF THE PREFERRED EMBODIMENTS

The present invention is directed primarily to an automated handling equipment or system for storehouses in which articles of different kinds regrouped according to their particular reference symbols are store in bins.

Preliminarily, it will be pointed out that the terms "article" and "bin" should be taken in their general and broadest meaning. Thus, the word "article" designates herein any object, part or separate component element adapted to be handled separately. Furthermore, the word "bin" designates any type of container adapted to be handled and having various configurations, such as substantially parallelipipedic bins, or hoppers or dispensers.

Since the present invention has been developed notably for the mail order industry, the typical form of embodiment thereof which is described herein relates more particularly to the general restocking of storehouses and to the processing of orders by regrouping articles to be dispatched by forming lots or groups of articles constituting a separate order. However, the orders to be executed may also relate to a single article or a plurality of articles.

It is also understood that this invention is applicable to a considerably wider field, notably in industrial plants, whenever the automated handling equipment using controlled self-powered trucks can be used in spare parts or other departments. Moreover, the specific nature of the parts or components kept in store is immaterial, provided that they can be processed in a modular storage system usually based on the use of socalled bins.

The automated handling system according to the present invention consists in fact of an equipment for controlling the operation of a fully robotised storehouse monitored by a central computer. Through a permanent or intermittent interactive programming relationship with the central computer, specific duties are developed to the self-powered truck or trucks of the present invention.

Figure 1:
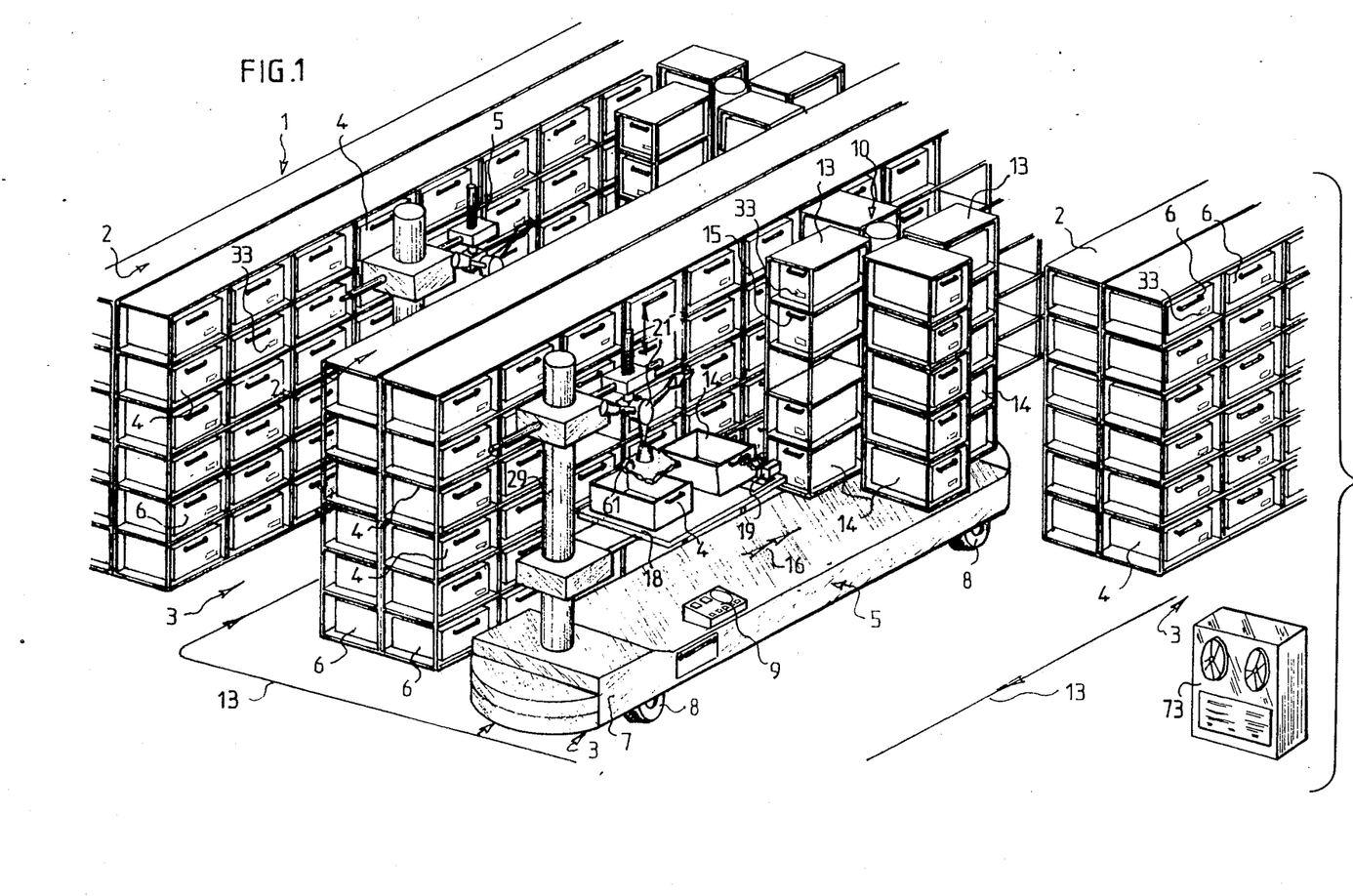
FIG. 1 is an isometric view of the automated material handling system of the present invention, showing a plurality of self-powered material handling trucks servicing a storehouse.

In FIG. 1 of the drawings, a storehouse in which articles of different types are regrouped in bins according to the kinds and reference symbols of the articles is shown diagrammatically. This regrouping by identical reference symbols is obviously a must in the case of a data processing system, so that the articles are identified by the computer through a suitable code.

More particularly, the storehouse 1 comprises a set of modular racks 2, a plurality of lanes or corridors 3 along which said modular racks 2 are disposed, and a considerable number of unitary storage bins 4 in which said articles are kept according to their specific types and reference symbols.

The bin configuration depends primarily on the particular nature of the articles to be store therein. As a rule, parallelipipedic bins are suitable for products packaged in boxes or tin cans, hoppers are adequate for loose, flexible articles, and dispensers are necessary for products of generally reduced dimensions which are rather difficult to pick up. However, other storage means and methods may be contemplated without departing inasmuch from the field of the invention.

The modular racks 2 disposed on either sides of the lanes 3 along which self-powered material handling trucks 5 can move freely, consist of an assembly of juxtaposed columns or stacks 6 in which said unitary storage bins 4 are received and guided in superposed relationship, so that they can easily be withdrawn and handled by the self-powered trucks 5.

The handling system according to the present invention comprises essentially a central or master computer 73 (FIG. 1), and one or a plurality of automated or robotised self-powered trucks 5.

The central computer 73 is adapted to control the system and said orders for articles to be regrouped. For this purpose, this computer, according to the customers' orders received sequentially by the computer, is adapted to select the number of necessary self-powered trucks and their accessories, and then to schedule the specific job to be performed by each self-powered truck. Accordingly, the stock in hand (quantity and configuration) and the diagram concerning the distribution of the articles and of the storage bins in the shop are constantly memorized and up-to-dated by this central computer 73.

The task developed by the central or master computer to a selected self-powered handling truck 5, according to the truck equipment, consists as a rule in performing either a restocking cycle or a cycle for assembling the items of several orders by picking up, sorting and regrouping articles kept in stock in order to gather the lots of articles constituting said orders. However, both cycles may be combined, if necessary.

For this purpose, the self-powered automated handling trucks 5 are adapted to handle said unitary storage bins in the storehouse 1 and to pick up articles from the bins 4 in the storehouse 1 for constituting the lots or articles and gather the orders as scheduled.

It is an advantageous feature of the invention that each self-powered automated handling truck 5 is autonomous and that a variable number of trucks can be run in the store, according to needs. Thus a definitely modular system is obtained, in lieu of a system depending on movable outfits disposed at fixed locations.

Each self-powered truck 5 comprises essentially a motorized chassis 7, an inboard slave computer 9 and an inboard store structure 10. This arrangement is common to both truck versions shown in FIGS. 2 and 3, respectively, which are intended the one for restocking purposes and the other for processing orders.

Figure 2:
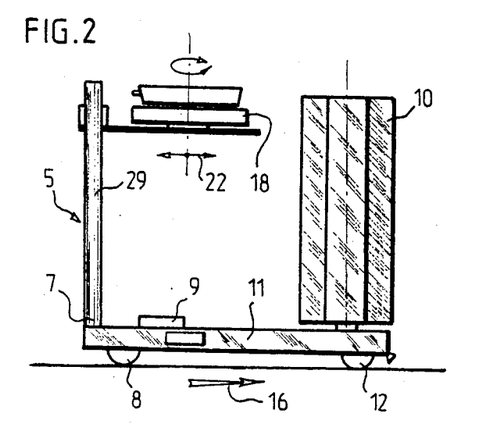
FIG. 2 illustrates diagrammatically the self-powered truck of the present invention according to a typical version consistent with restocking operations.
Figure 3:
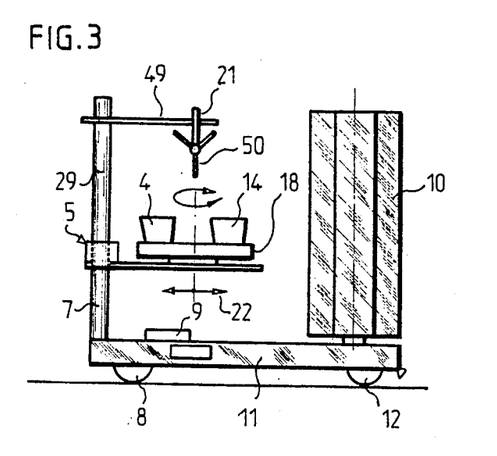
FIG. 3 is a view similar to FIG. 2 but showing a self-powered truck according to a typical version consistent with the unitary picking up of articles from bins and with the sorting of orders concerning several articles.
Figure 4:
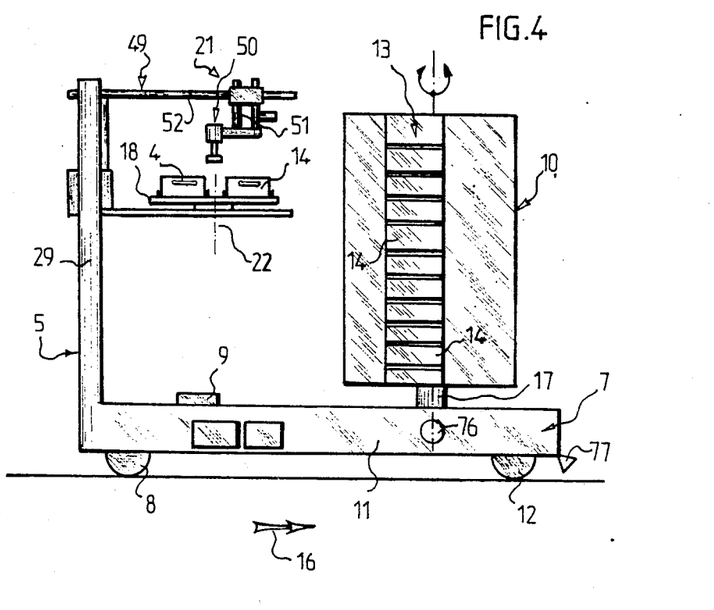
FIG. 4 is an elevational view of an automated, self-powered truck equipped with means for picking up articles.

The motorized powered chassis 7 further comprises drive or translation means 8 permitting of moving the truck along the lanes 3 of storehouse 1 past said modular racks 2. As illustrated in FIGS. 2–4, the motorized chassis 7 comprises a main frame structure 11 having a width consistent with that of lanes 3, this structure 11 being mounted on wheels 12 driven by said drive or translation means 8.

The drive or translation means 8 may consist notably of one or a plurality of d.c. motor and reduction gear units coupled to a follower cooperating with an under-the-floor wire or conductor shown diagrammatically in FIG. 1 in the form of arrowed lines 13. This technique is generally known to those conversant with the art as a "wire guidance truck system".

For this purpose, the powered truck 7 will comprise a positioning antenna 77, disposed under the chassis 7 and adapted to detect and follow said wire buried substantially along the median line of each lane 3 of store 1. This positioning antenna is capable of detecting an emitted frequency, a different frequency being provided for each lane.

Moreover, the powered truck 7 will also comprise a bin code reader 78, disposed substantially at floor level to permit the detection of the stacks 4 of the various racks 2.

For this purpose, a label carrying a reference mark, notably a digital mark, is provided on each column 4. In each lane 3 the columns 4 of racks 2 are advantageously marked and arranged according to an increasing digital sequence from the beginning to the end of the lane. This detection mode is advantageous from the point of view of the coding procedure assimilated by the master computer since it will dispatch the truck to a lane having a predetermined frequency up to the selected, $n^{th}$ column.

In an advantageous form of embodiment the bin code reader consists of a bar code reading system of a type well known in the art.

On the other hand, the inboard computer 9 mounted on the truck 5 so as to travel therewith is interactive with the fixed master computer for managing the passages and stoppages of the self-powered truck 5 in the storehouse 1 and also for controlling the truck movements.

More particularly, the inboard computer 9 carried by each self-powered truck 5 comprises essentially:

a circuit interactive with the central or master managing computer of the system for data transmission purposes. The data are transmitted by radio waves, by using an antenna and a contactless pick-up at predetermined locations disposed along the path followed by the truck, or possibly by sliding or frictional contact with an electric wire extending along the path followed by the truck 5.

a digital control circuit and a processing logic for controlling the positions of pick-up and griping means to be described in later part of this specification.

a micro-calculator for controlling and guiding the movements of the self-powered truck 5 along the lanes in the store, notably by monitoring the follower associated with the aforesaid wire controlling the drive means 8 of the self-powered truck 5 in a system utilizing wireguided trucks.

a mini-computer in which, in addition, the job to be carried out by the self-powered truck 5, the configuration and plan of the storehouse 1, and the configuration of the handling tools or accessories carried by the specific truck 5 are memorized. This mini-computer is adapted notably to control all movements of the self-powered truck 5 and also to plan the operations to be carried out by the truck throughout the accomplishment of this job under the control of the central or master managing computer.

Regarding the technological structure of the inboard computers, an adequate electronic technology using microprocessors and other devices in current use and well known in the art considered herein will be adopted.

Moreover, according to the present invention, for minimizing handling times by reducing the passages, for constituting lots of articles corresponding to an order by following several orders simultaneously, or for restocking different articles in the stock during the passages, the self-powered truck 5 advantageously comprises an inboard store structure 10 constituting a small buffer store incorporated in the truck 5 so as to travel therewith during all the truck movements. This store structure 10 will thus permit of making temporary stocking and sorting operations for constituting the various lots of articles according to the orders to be processed simultaneously throughout the job decided by the master or central computer.

In this respect, and as shown notably in FIGS. 1–5, the inboard store structure 10 comprises an assembly of columns 13 adapted to receive and hold in superposed relationship a number of order receiving bins 14.

More particularly, the inboard store structure 10 is a kind of swivel structure detachably mounted to the self-powered truck 5 and consisting of a plurality of columns or stacks 13 made of several superposed bins 14, said columns or stacks being disposed around the structure periphery. This shop structure 10 is adapted to rotate under the control of a driving member 76 controlled in turn by the inboard computer so as to position the front face 15 of column 13 of selected bins 14 abreast of the pick-up and gripping means, at right angles to the direction of travel of the self-powered truck 5, in the direction of the arrows 16 in the drawings.

In a preferred form of embodiment of the shop structure 10 of the present invention, this structure comprises four columns or stacks 13 disposed at spaced angular intervals and adapted to rotate about a central vertical shaft 17. This shaft 17 is driven by a motor and reduction gearing unit, preferably of the d.c. type, and such that the rotary store structure can be stopped with precision notably after every 90-degree angular movement. This technique is now conventional and generally known to those conversant with the art.

According to the size of the bins (which may have any desired and suitable dimensions) the number of bins implemented will correspond to the best possible exploitation of the inboard store structure. In the specific case of the exemplary system contemplated herein, the bins are 600 mm in length, 400 mm in width and from 150 to 200 mm in height, and their number may vary from 40 to 120 in one store structure 10. However, these Figures are given by way of example, not of limitation. According to the present invention, to permit the picking up and handling of these bins and also of the articles contained therein in a fully automatic manner without any manual intervention whatsoever, the self-powered chassis 7 comprises essentially a platform 18 adapted to receive the bins, means 19 for picking up the bins, means 20 for recentering the receiving platform 18, and means 21 for gripping the articles.

The reception platform 18 is adapted to carry at least one stock bin 4 and/or one order receiving bin 14. In addition, this platform is at least movable by translation to a slight extent, plus or minus, as shown by the arrows 22 in the drawings, in the direction 16 of the self-powered truck 5 along the lanes of the storehouse.

Figure 6:
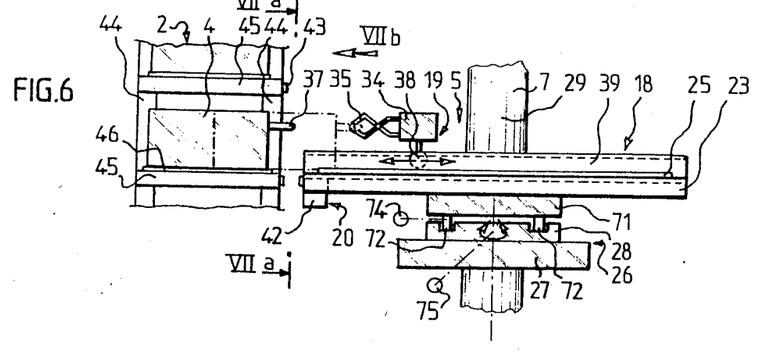
FIG. 6 is a fragmentary elevational view showing the truck of FIG. 4 with details of the bin receiving platform, of the bin pick-up means and of the means for recentering the bin receiving platform.
Figure 7A:
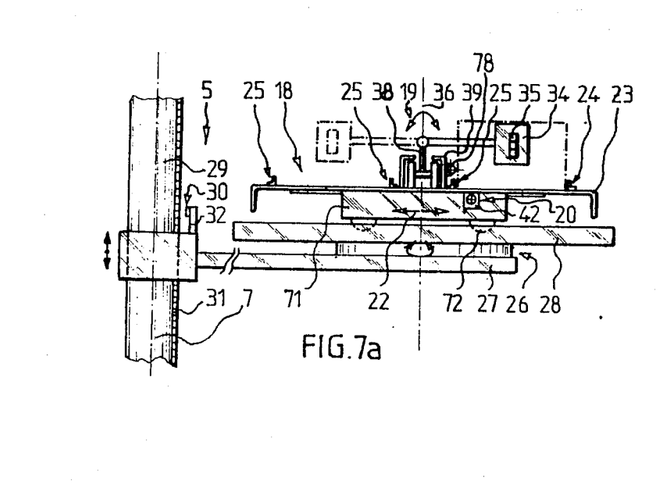
FIGS. 7a and 7b illustrate diagrammatically in elevation details of the present invention with reference to FIG. 6, the view being taken in the direction of the arrows VIIa-VIIa and arrow VIIb, respectively.
Figure 8:
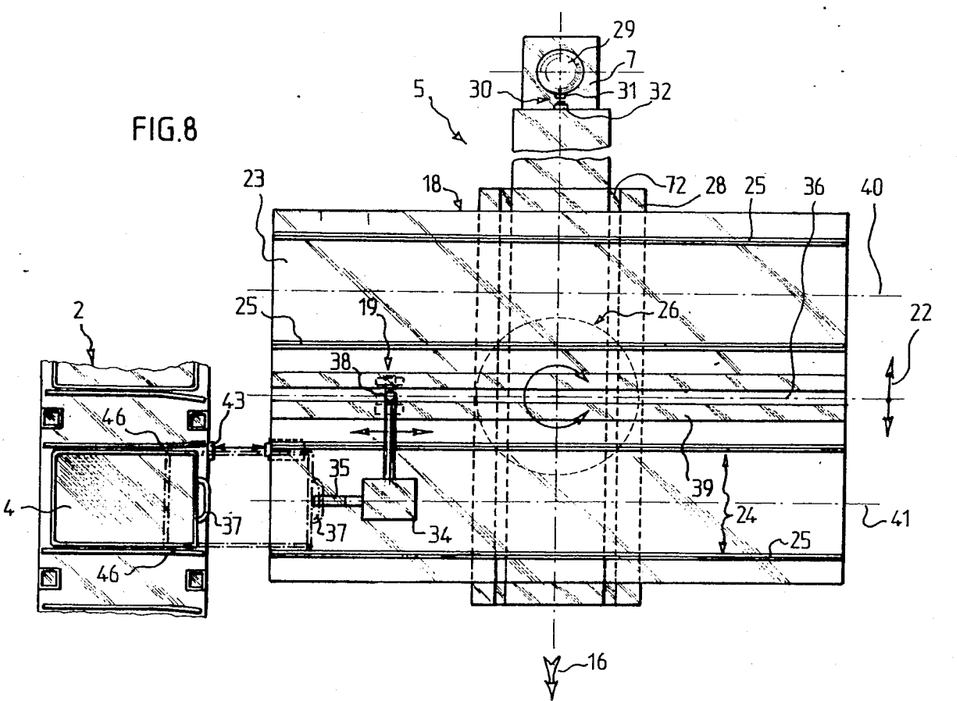
FIG. 8 is a plan view showing details of the self-powered truck of FIGS. 6 and 7.

More particularly, as shown in FIGS. 6, 7a and 8, the bin receiving platform 18 comprises:

- a bin receiving top platform 23 rigidly coupled to a platform translation carriage 71 provided with bin guide means 24 adapted to control and facilitate the positioning of the stock bins 4 and/or of the order receiving bins 14 during the transfer movements of the bins handled by said pick-up means 19.
- a turret-type carriage 26 consisting essentially of a base plate 27 rigidly mounted to said powered chassis 7, and of a turret 28 adapted to revolve freely, this turret 28 being carried and guided by said base plate 27, said turret 28 being provided with a pair of guide grooves 72 along which the platform translation carriage 71 is adapted to travel.

The guide means 24 advantageously consist of slideways 25 secured to the top platform 23, the distance between centres of said slideways 25 corresponding substantially to the dimensions of the outer bottom surface of bins 4 and/or 14 to be picked up, and said slideways diverge slightly, as shown notably in FIG. 8, in order to facilitate the insertion of the bins 4 or 14 between them.

The translation carriage 71 is secured to the bottom face of the top platform 23 and comprises a drive member 74 adapted to move the bin receiving platform 18 linearly at low speed in a direction 22 defined by said guide grooves 72 and said turret 28.

The member driving this carriage 71 is notably a d.c. motor and reduction gearing unit capable of driving the complete reception platform 18 at a low, controllable speed for positioning this platform.

Moreover, during its movements of translation the carriage is guided by known means such as groove-engaging rollers or the like.

Besides, the turret carriage 26 comprises power means 75 for rotatably driving the turret 28 and consequently the reception platform 18 in relation to the base plate 27 for pivoting this bin receiving platform 18 horizontally to position this platform at least either in front of the stock bins 4 contained in the modular racks 2 of store 1, or in front of the order receiving bins 14 contained in said inboard store structure 10.

This complementary power means may also consist for example of a d.c. motor and reduction gearing unit adapted to position and stop the platform notably in positions spaced 90-degree apart according to a method well known to those conversant with the art.

It will be seen that for supporting the reception platform 18 and move this platform vertically up and down to the different levels corresponding to the racks 2 of storehouse 1 or to the columns 13 of the inboard shop structure 10, the powered chassis 7 may advantageously comprise a guide shaft 29 rigidly mounted to the truck chassis 11 and disposed substantially vertically. Thus, the bin receiving platform 18 can move up and down along this shaft 29.

This translation and guiding arrangement is constructed according to methods and techniques well known to those conversant with the art and may comprise for example a rack and pinion mechanism or a chain and pinion mechanism responsive to a drive motor advantageously of the same type as the above mentioned driving units.

Moreover, the guide shaft 29 is provided with a digital sensor 30 for determining and displaying the level attained by said platform 18, as shown in FIG. 7a. This sensor 30 is associated with a digitized scale 31 extending throughout the height of shaft 29 and with a coder for reading the scale 32 and delivering electrical data signal as a function of the momentary level or height of the bin receiving platform 18 with respect to a predetermined reference level, as a rule the zero or floor level. This procedure is well-known and conventional in the art, notably in machine-tools, and enables the operator to check and set at any time the extent of the vertical movement accomplished by the platform.

Attention must be drawn on the fact that by virtue of this height sensor 30, the data of which are fed to the inboard computer 9, the automated handling system of the present invention will be informed of the vertical position of platform 18 and thus be able to control movements preset by the central monitoring program. The data delivered by this sensor 30 are processed in the digital control circuit and the processing logic of said inboard computer.

Figure 7B:
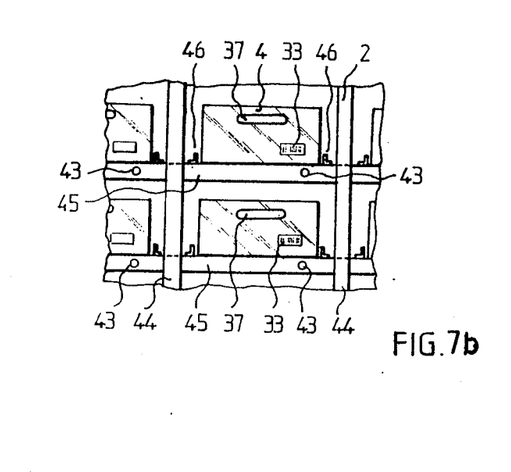

As shown more particularly in FIG. 7b, each unitary stock bin 4, like each control bin 14, carries an identification label 33. This label bears a mark, notably a bar code type mark, known to the central computer and to the inboard computer. With this type of detection, the system according to the present invention will know the bin contents, the corresponding data having previously been stored in the memory of the central computer when filling the bins.

In addition, the bin receiving platform 18 will comprise a bin code reader 78, for identifying the specific bin to be picked up and checking the concordance between the read bin and the bin to be handled which was preselected by the master computer and/or the inboard computer.

Finally, in a particularly beneficial form of embodiment, the top platform 23 of the receiving platform system 18 comprise means for weighing the stock bin 4 picked up in the storage shop 1, so that a double weighing operation can be performed before and after the gripping of an article in the bin 4 for ascertaining the actual concordance between the weight of the picked up article and the theoretical weight of the article preselected by the central computer and/or the inboard computer.

With these control means, such as the bin code reader 78 and the double weighing means 79, it is possible to check the sequence of steps of the handling cycle performed by the self-powered truck 5 and to remove, if necessary, possible anomalies likely to occur in this cycle. Thus, a reliable operation of the system is obtained.

Regarding the means 19 for picking up articles from the bins, they are designed according to the present invention for either moving a unitary stock bin 4 between the racks 2 of storehouse 1 and said bin receiving platform 18, or to move a unitary stock bin 4 between said platform 18 and the inboard store structure 10, or still to move an order receiving bin 14 between the inboard store structure 10 and said reception platform 18.

More particularly, as shown notably in FIGS. 6, 7a and 8, the bin pick-up means 19 comprise a draw-out device 34 guided and carried by the bin receiving platform 18 and provided with lazy-tong gripping means 35 movable with the bin 4 or 14 to be handled.

The draw-out device 34 is movable in the longitudinal direction with respect to the major axis 36 of receiving platform 18 and is capable of gripping the front face of the selected bin 4 or 14 so as to pick up this bin either from the storehouse 1 or from the inboard store structure 10, and cause the same bin to slide towards said reception platform 18 and/or away from this platform 18 for replacing the bin into the storehouse rack 2 or the inboard store structure 10.

In this respect, the fore faces of the stock bins 4 or order bins 14 have preferably the same configuration, at least as far as the bin area to be gripped by the draw-out device 34 is concerned.

According to a preferred form of embodiment of the present invention, this gripping area comprises a handle 37 and the draw-out device 34 consists of an extractor having lazy-tongs 35 carried by a carriage 38 slidably mounted in a guide rail 39 extending longitudinally of the major axis 36 of reception platform 18, this device being adapted to grip the handle 37 secured to the front face of each bin 4 or 14.

Furthermore, said lazy-tong draw-out device 34 is advantageously pivoted to and somewhat shifted in relation to said guide rail 39 in order to provide two axes 40 and 41 (FIG. 8) of movement in a direction parallel to the major axis 36 of platform 18.

Figure 5:
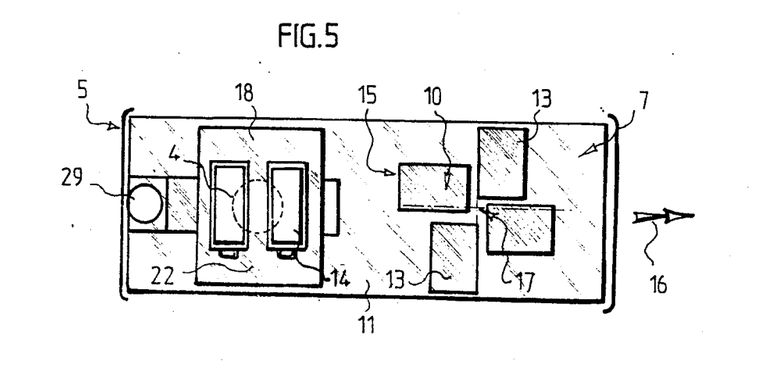
FIG. 5 is a plan view from above of the self-powered truck of FIG. 4.

With this arrangement, it is possible, by using the same draw-out device 34, to dispose side by side on the bin receiving platform 18 two bins, namely one bin 4 removed from the racks of the storehouse 1, and another bin 14 removed from the inboard store structure 10, as illustrated notably in FIGS. 3-5 of the drawings.

Figure 12:
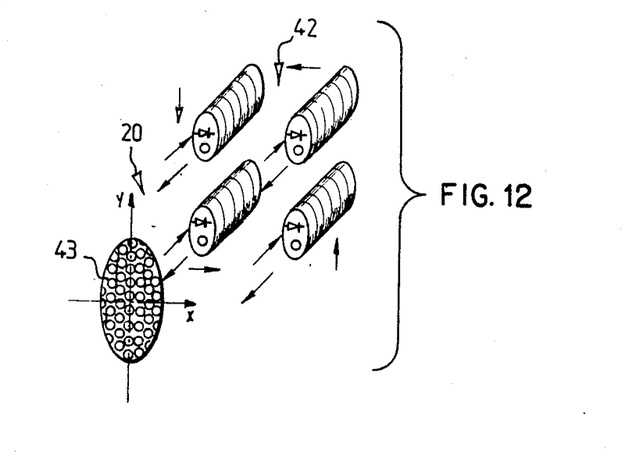
FIG. 12 illustrates details of the recentering means, according to a first form of embodiment thereof.
Figure 13A:
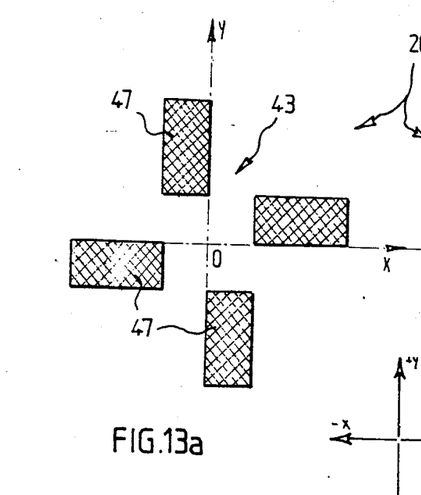
FIGS. 13a and 13b illustrate details of the recentering means of the present invention according to a second form of embodiment thereof.
Figure 13B:
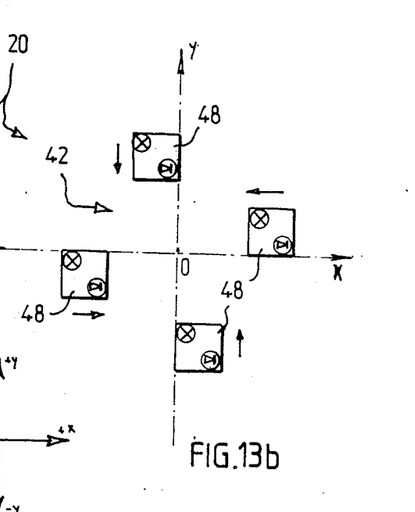

Besides, according to the present invention, an accurate positioning in both abscissa and ordinate of the pick-up means 19 in front of a bin 4 selected by the handling system and contained in the racks 2 of the storage means 1, the powered chassis 7 comprises means 20 for recentering the bin receiving platform 18. Said means 20 are illustrated notably in FIGS. 6-8, and their mode of operation is illustrated in FIGS. 12 and 13.

More particularly, the recentering means 20 comprise a sighting device 42 for properly positioning in both abscissa and ordinate. This sighting device 42 comprises one or a plurality of positioning sensors carried by said receiving platform 18 and a multitude of reflectors 43 carried by the racks 2 of the storage means 1 and positioned straight below each stock bin 4.

For this purpose, FIG. 7 illustrates in front view a rack 2 of storehouse 1 which comprises upper uprights 44 and horizontal rails 45 so spaced from one another that the stock bins 4 can be inserted therebetween. In an advantageous form of embodiment, the reflectors 43 are positioned in fact on said horizontal rails 45.

On the other hand, for properly positioning the bins 44 with respect to said reflectors 43, the bins are advantageously disposed between guide rails 46 of the same type as those described in the foregoing and adapted to act as guide means 24 for the receiving platform 18.

These recentering means 20 are adapted, via the inboard computer, to control the above-described drive members and thus permit the up- or downward movements of the receiving platform 18 and/or the forward or backward movement of this platform along the longitudinal axis of movement of the self-powered truck 5.

Thus, after a preliminary positioning step obtained by stopping the means 8 for causing the movements of translation of the powered truck 7 in front of the selected column 6 of store 1, on the one hand, and by prepositioning the height of platform 18 by means of the digital height sensor 30, this platform 18 will be positioned with precision in both abscissa and ordinate, whereby any difference in level between this platform 18 and the top surfaces of the horizontal rails 45 of racks 2 will be eliminated, and the guide means 25 and 46 of the bin receiving platform 18 will be aligned with the storage means 1. This prepositioning and recentering steps will avoid the effects of the inertia of the self-powered truck, of the difference likely to exist between the various types of self-powered trucks, of the differences in level between various points of the store, and of the constructional defects and differences most likely to occur in the storage racks, etc.

Stress should be laid on the fact that the recentering and sighting device 20, 42 could also be used for accurately positioning along both abscissa and ordinate axes the reception platform 18 with respect to the bins 14 of the inboard store structure 10. However, this device is not always necessary for the degree of precision of the prepositioning is generally sufficient.

In this respect, the inboard store structure 10 is also provided with guide means or slideways (not shown) of the same type as those used in the store 1 and on the bin receiving platform 18.

Furthermore, it will be seen that the positioning sensors 42 of sighting device 20 are arranged for delivering two output signals as a function of the four quadrants formed by the two orthogonal axes x and y (abscissa and ordinate) completed by a signal proving the presence of a reflector 43 in front of the sighting device 20. This is shown notably in FIGS. 12 and 13a, 13b illustrating diagrammatically two possible forms of embodiment.

In FIG. 12, the positioning sensors 42 consist of four optoelectric emitter-receiver devices each adapted to emit a light or infrared signal and to detect the retransmission of this signal reflected by a reflector 43. Thus, when the sighting device 20 is aligned with a reflector 43 according to the specific emitter-receiver activated, it will be possible to know the position of the movable body with respect to the reflector 43 in one of the four quadrants and the movements of horizontal or vertical translation of the bin receiving platform 18 will be controlled so that none of the four sensors will be activated. In this case, the reflector 43 will be centered susbtantially at the intersection of the two x and y axes.

FIG. 13 illustrates the second form of embodiment wherein the reflector 43 shown only diagrammatically in FIG. 13a consists of an orthogonal arrangement of four elementary reflectors 47, and the positioning sensors 42 shown in FIG. 13b are made of four emitter-receiver devices 48 similar to the preceding ones.

In this form of embodiment, the upward and downward movements, and the movements of translation, of the receiving platform 18 are also controlled, but the function is reversed. In fact, a proper positioning is obtained when the four sensors 48 register with the unitary reflector 47 and are therefore activated.

These two positioning devices are given by way of example only and could of course be used in other re-centering systems without departing from the basic principles of the invention.

Finally, according to the present invention, for picking up an article from the stock bin 4 thus positioned on the receiving platform 18 the motorized chassis 7 comprises gripping means 21 adapted to pick up an article and to subsequently drop this article into the order receiving bin 14.

Figure 9:
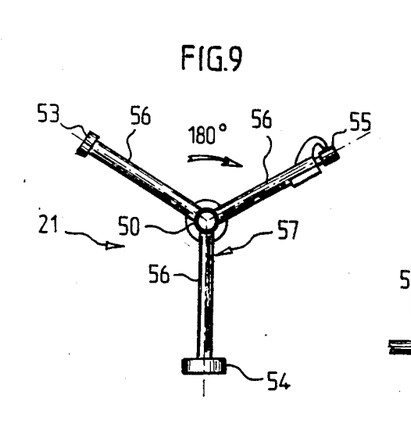
FIG. 9 is an elevational view showing a detail of the self-powered truck of FIG. 4, with means for picking up articles.
Figure 10:
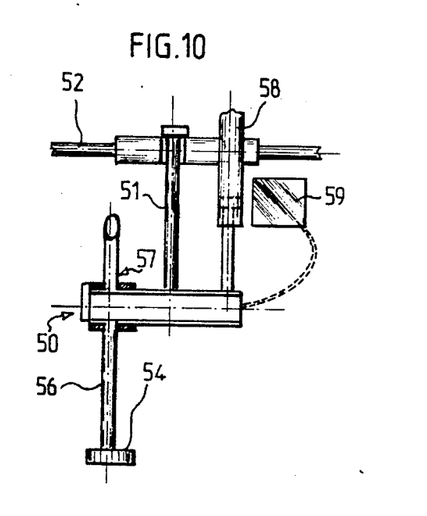
FIG. 10 illustrates in side elevational view the gripping means of FIG. 9.
Figure 11A:
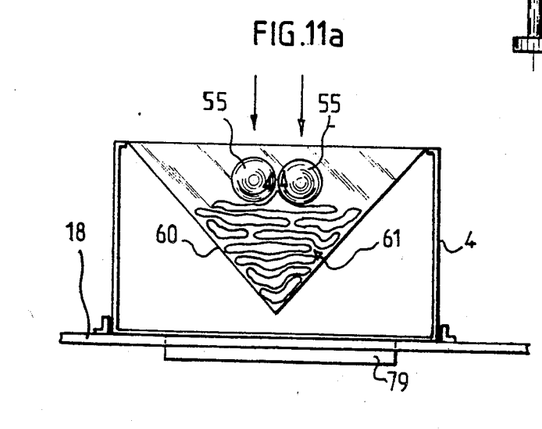
FIGS. 11a and 11b illustrate the various steps of the operation of the tool incorporated in the gripping means of FIG. 9.
Figure 11B:
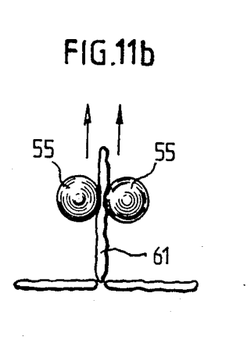

These gripping means are illustrated notably in FIGS. 1, 3, 4 and more in detail in FIGS. 9–11.

More particularly, the gripping means 21 consist of a manipulator unit 49 adapted to be lowered into the various stock bins 4 and to pick up articles therefrom, this manipulator being mounted to a vertically movable supporting arm 51 mounted in turn to a cross-piece 52 carried by the motorized chassis 7 of the self-powered truck 5, this cross-piece 52 being actuated and guided by the aforesaid guide column 29 so that said article gripping means 21 can move up and down. It will be seen that the manipulator unit 49 will advantageously follow the vertical movements of the bin receiving platform 18 so as to preserve their mutual positions.

On the other hand, the pick-up head 50 comprises a vertically movable support arm 51 to permit the lowering of this head into the bins 4 carried by the reception platform 18 for picking up articles therefrom.

Considering the extremely diversified nature of the articles kept in the store, the pick-up head 50 may be fitted with different gripping tools which are brought into an active position when appropriate. In the example shown in FIGS. 9 and 10, the specific case of three different gripping tools is contemplated. These tools 53, 54 and 55 are mounted to the ends of radial arms 56 of a spider assembly 57.

This spider assembly 57 is rotatably mounted so that the selected tool 53, 54 or 55 can be positioned straight above the bin before operating the tool. This spider 57 is carried by one end of support arm 51 and adapted to be moved vertically by means of a fluid-actuated cylinder 58 the piston stroke of which permits of lowering the spider 57 into the storage bin 4 supported by the receiving platform 18.

In the example illustrated in FIG. 9, the gripping tools comprise a small suction cup 53, a larger suction cup 54 and cylindrical rollers 55. The mode of operation of suction cups 53 and 54 is well known: a vacuum is created in the cup so that the selected article will adhere with a certain force to the cup. If desired, the suction cup 54 may be associated with means permitting its angular movement from 0° to 90°, notably for stowing the article thus picked up.

The vacuum produced in the selected cup is obtained by means of a turbine 59 illustrated diagrammatically in FIG. 10. This turbine is connected to the spider 57 provided for this purpose with hollow branches 56 and with a distributor for interconnecting the hollow branch 56 of the selected suction cup and the turbine.

The cylindrical rollers 55 are specially designed and adapted to engage flexible objects disposed loosely in the bins 4 provided, notably in this case, with inner storage hoppers 60. In fact, it is rather difficult to pick up a single flexible article among several such articles disposed loosely in a hopper, for example in the case of textile articles. A gripping device of this type is disclosed and illustrated notably in the U.S. patent application Ser. No. 06/578,865 filed on Feb. 10, 1984 now U.S. Pat. No. 4,578,013 issued Mar. 25, 1986.

The principle of operation of this system is shown diagrammatically in FIGS. 11a and 11b. The cylindrical rollers 55 are driven in opposite direction by a motor (not shown) and bear against each other along their generatrices.

These rollers 55 are lowered into the hopper 60 until they bear on the top of the articles 61 disposed loosely in the hopper, as illustrated in FIG. 11a. Then, the rollers 55 are caused to rotate so as to pick up an article 61 or its flexible packing contacting said rollers, as shown in FIG. 11b.

A sensor is provided for detecting the presence of the article 61 or of the packing thereof between the rollers 55, and when this article has been caught the rollers are stopped immediately and the gripping tool can be raised with the article 61 pinched therebetween.

To release the article 61 it is only necessary to reverse the direction of rotation of rollers 55. On the other hand, the use of stowing hoppers 60 is advantageous because the articles tend to gather in the bottom of the hopper irrespective of their quantity.

The various self-powered trucks 5 can be energized for example by means of storage batteries (not shown) carried by the truck chassis. These batteries are recharged periodically for example during the passage of the trucks along the lanes 3 which are equipped with a floating-contact supply line, according to a method well known in the art.

Therefore, the self-powered truck 5 as described hereinabove can be used for picking up articles, irrespective of their nature, from the stocks and subsequently assembling the articles thus picked up from the order bins 14 stored in the inboard store structure 10, said bins 14 being subsequently directed to an auxiliary dispatching station equipped with packing means.

For this purpose, the inboard store structure 10 is provided with exchange rails or slideways (not shown) for transferring the store structure 10 to an automated packing station and permitting the fitting of another, empty store structure 10 on the truck concerned.

Moreover, the self-powered truck 5 according to the instant invention may also be used for restocking the store, and in this case the handling means 21 remain inoperative and the truck will have the configuration shown in FIG. 2. In fact, in this case, the only operation required consists in drawing out bins on the one hand from a manual store restocking station for delivery to the inboard store structure 10 and on the other hand from this inboard store structure 10 for delivery to the storehouse 1.

Thus, according to the particular nature of the operations to be executed, the self-powered truck according to the instant invention can be equipped with different tool means as described hereinabove, and furthermore various forms of inboard store structures 10 may be provided according to specific requirements. However, the stock bins 4 and order receiving bins 14 should advantageously have the same external configuration so that the inboard store structure 10 can be operated indifferently with two types of bins, that is, 4 or 14.

Figure 14:
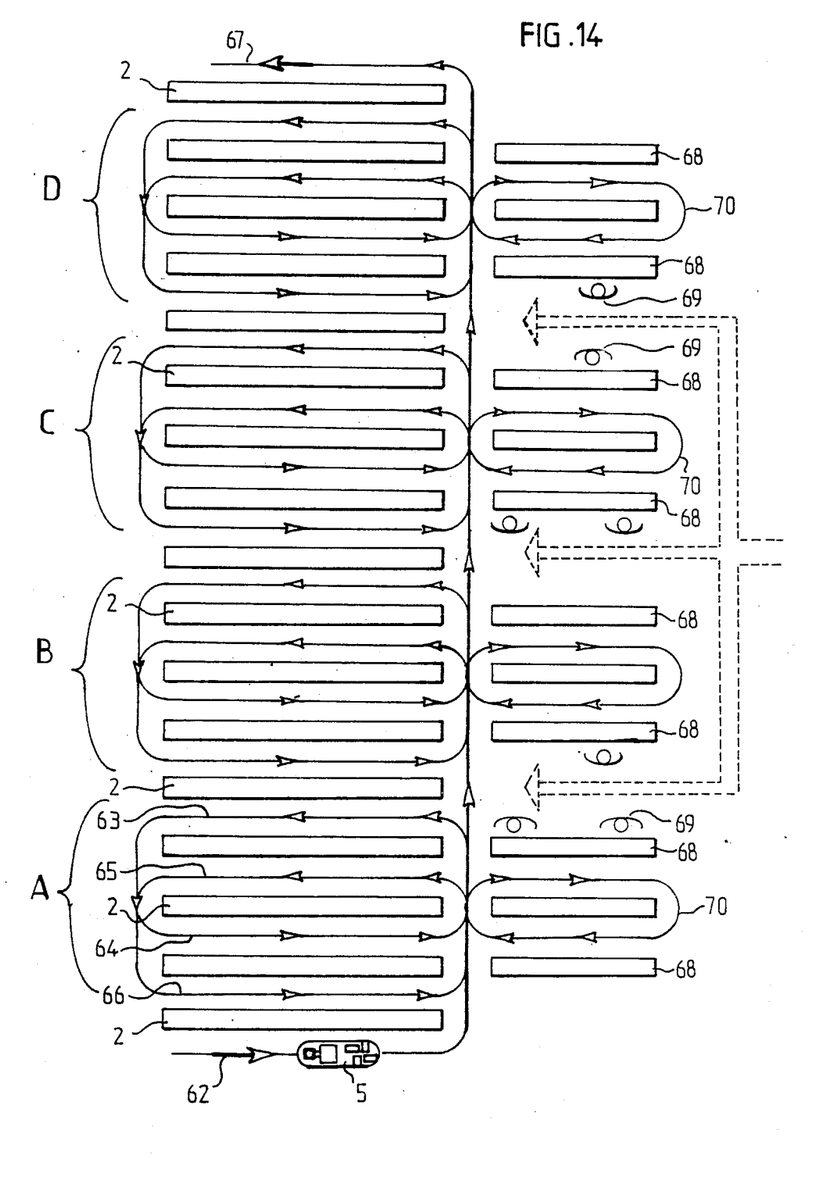
FIG. 14 illustrates diagrammatically a typical layout showing the paths followed by a self-powered truck in an automated storehouse.

FIG. 14 is a diagrammatic plane view from above showing a storage system 10 equipped with automated handling means comprising self-powered trucks 5 according to the instant invention. This mode of operation is given by way of example, not of limitation.

The store 1, comprising as already described hereinabove storage racks 2 disposed along the lanes 3 of the store and filled with a great number of unitary stock bins 4, is divided preferably into several sections. In the example illustrated, four sections denoted A, B, C and D are contemplated, each section corresponding to a different kind of article, with bulky articles disposed preferably in the "upstream" sections and small, loose articles in the subsequent sections.

The various orders received from customers and to be regrouped and executed are entered in the memory of the master or central computer of the system. As a rule, the central system controls and manages several thousands of lots of articles to be regrouped, formerly referred to as an "order", each lot being combined and fragmented into an elementary lot of orders consisting of several lots of articles to be regrouped which corresponds to an inboard store structure 10 of a self-powered truck 5. The central system optimizes this assessment among the various self-powered trucks operated in the handling system.

When an elementary lot of orders has been assigned to a self-powered truck equipped with an inboard store structure, this particular truck will perform a specific "job". In fact, the central managing computer transmits the data concerning the various steps of the cycle to be accomplished by the self-powered truck 5. This transmission of data is further made possible notably the provision of interactive program means between the central computer and each inboard computer, as already explained hereinabove.

The self-powered truck 5 selected by the central managing system and having also its specific "job" entered in the memory of its inboard computer, together with the configuration and plan of the storage system 1, the configuration and tool equipment of the self-powered truck 5 and its inboard store-structure 10, performs a complete range of handling operations on the bins and possibly on the articles themselves, by following a predetermined path as shown by way of example in FIG. 14.

The runs of the various self-powered trucks 5 for regrouping the lots of articles and assembling the different elements of a given order take place notably according to the so-called imbricated loop made.

In the example shown in FIG. 14 the empty self-powered trucks 5 from the dispatching station are introduced into the system at 62 and directed to the lane 63 for picking up articles from the racks 2, and then travel along lanes 64 and 65, before returning via lane 66 so as to pass through all the lanes of section A.

Then, the truck 5 travels through the next sections B, C and D in the same manner, but of course it is unnecessary to have the truck run through all the lanes in case not a single article has to be picked up in a two-way run. When leaving the last section D, the trucks 5 are directed at 67 to the packing and dispatching station.

It will be seen that in an advantageous form of embodiment the lanes of the storehouse 1 are such that a self-powered truck 5 can travel therein while picking up articles from any bins in racks 2, whether they are on the off-side or the near-side of the truck. Thus, the operations will be speeded up and the compactness of the store can be improved considerably. However, it is also possible to contemplate a system with lanes of a width sufficient to enable one truck to overtake another truck, this arrangement being particularly advantageous in case of relatively large units in which each truck operates along only one side of the lane.

Besides, the storehouse could be restocked by using auxiliary racks 68 as illustrated in FIG. 14. A specific feature of these auxiliary racks 68 is that the bins contained therein can be drawn out from one or the other face, front or rear. Thus, the operators 69 posted behind the racks can remove the empty unitary stock bins from the rack 68 so as to fill them again with articles received from a general supply store (not shown), the thus filled unitary stock bins being subsequently reintroduced into the racks 68.

Thus, self-powered trucks 5, such as described hereinabove with reference to their restocking version shown in FIG. 2, will travel past the auxiliary racks 68 along lanes 70 so as to carry the empty unitary stock bins and take again the filled unitary stock bins for restocking the racks 4 of storehouse 1. The picking up of articles or parts by the self-powered trucks 5 associated with racks 70 and travelling along lanes 70 is still possible, without interfering with the picking up of reference articles during the restocking operation.

In the selected example, it is contemplated to operate simultaneously self-powered trucks 5 for picking up articles or parts from the stock and other self-powered trucks 5 for restocking the store. However, when work is slowing down in the store it is possible to utilize a same self-powered truck 5 operating at times as a restocking truck and at other times as a pick-up truck for gathering the elements of an order.

The sequence of steps for picking up articles in the storehouse by means of a truck 5 may be summarised as follows. The central or master computer of the system 1 delivers to the inboard computer 9 the data concerning the job to be accomplished. Each picking up of articles in the storehouse 1 is indexed according to the position of the article, which is known to the system, in the storehouse.

To fetch a given articles in a unitary stock bin 4, the self-powered truck 5 having received from its inboard computer 9 data concerning: the lane 3, having a predetermined frequency; the column 6 of rack 2 in the corresponding lane, also denoted by sequential serial numbers; the level of the bin 4 to be picked up in said predetermined column 6, which is denoted notably by a digital distance from a reference level; the number of the stock bin 4 (marked on the bin itself); the unitary weight of the article to be picked up; the quantity of articles to be picked up; the type of gripping or pick-up tool required for picking up the article; the number of the order receiving bin 14 in the inboard store structure 10, and finally the particular column 13 of this store structure which contains the bin 14, and its level with respect to a reference level.

With all these data, the self-powered truck 5 concerned will thus move towards its lane, for example as described in the foregoing with reference to FIG. 14. When the truck 5 engages the proper lane, its rack code reader acknowledges the columns so as to preposition the truck in front of the selected column, the truck being driven at low speed during the prepositioning phase.

When the truck 5 eventually registers with the selected column, it is stopped. It should be remembered that during this particular translation period, the order receiving platform 18 will be prepositioned at low speed at the level of the bin to be drawn out by means of its drive members responsive to the digital height sensor 30. Likewise, the gripping means 21 are provided with tools 53, 54 or 55 consistent with the particular type of articles to be handled.

Then, the recentering means 20 become operative through the medium of the sighting device 42 which, by controlling the drive members controlling the reception platform 18, will position this platform accurately in both abscissa and ordinate in front of the selected stock bin 4 to be manipulatd. Upon completion of this positioning step, the pick-up means 19 of the bins concerned are actuated for slidably transferring this bin onto the reception platform 18.

Then, the thus manipulated stock bin is centered by means of the sensors and drive members of said platform 18 with respect to the article gripping means 21. The arm 51 supporting the gripping head 50 will cause the vertically movable tool to be firstly lowered into the stock bin 4 for picking up the article and then raised out from the bin.

On the other hand, also during the truck translation, the order receiving bin 14 is deposited on the order receiving platform 18, as illustrated in the drawings, substantially the same way as the stock bin 4 is drawn out.

In fact, the inboard store structure 10 is caused to rotate so that the selected column 13 is caused to register with the order receiving platform 18, this platform being brought to the desired height for drawing out the selected bin 14 and cause this bin to slide onto platform 18.

In thise respect, it will be seen that the platform 18 will rotate through an angle of 90 degrees with respect to the direction of travel of the self-powered truck 5 so that both bins 4 and 14 be substantially parallel to each other.

When the gripping means 21 are raised, the bin receiving platform 18 is moved to a position in which the selected order receiving bin 14 is straight below the article picked up by the tool. In this position, the article is released and falls into the receiving bin 14.

Then, the bins 4 and/or 14 are brought back to their relevant columns 4 and/or 13 be reversing the above-described sequence of steps, and the truck is moved to another position for picking up another article.

It will be seen that with the means and method of the present invention most of the preliminary steps performed by the specific means and members carried by the truck take place during the runs thereof, in order to minimize handling times. On the other hand, the risks of loosing articles during the pick-up operations are minimized since the gripping or pick-up head 21 is held against any movement of translation during these operations, and only the underlying bins are moved via platform 18.

Moreover, many checking operations are contemplated for warranting a proper handling of the articles. Thus, for example, as already mentioned in the foregoing, the reference mark carried by the bin to be handled which was selected by the computer, and the known theoretical weight of the picked-up article is compared with the actual weight of the article picked up by the gripping means.

Of course, many modifications and changes may be brought to the various component elements of the handling system of the present invention, and other cycle control means within the skill of those conversant with the art may be contemplated without departing from the basic principles of the invention as set forth in the appended claims.

What is claimed is:

1. An automated handling system intended for a storehouse, ware-house or other industrial premises in which miscellaneous articles are stored, for allowing either the restocking of the storehouse or the regrouping of articles picked up in the storehouse to constitute lots of articles corresponding to a cutstomer's order, said storehouse comprising an assembly of modular racks, a plurality of lanes along which said modular racks are disposed, and a multiplicity of unitary stock bins in which said articles are stocked according to their nature and reference symbol, said racks consisting of an assembly of juxtaposed columns in which said unitary stock bins are disposed in superposed relationship, said system comprising essentially:

a central computer for managing and controlling the system and the customers' orders;

at least one automated self-powered handling truck adapted to handle said bins in said storehouse and to pick up articles from the bins of said storehouse and constitute lots of articles and gather said orders, said self-powered truck comprising essentially;

a motorized chassis and translation means for moving said truck along the lanes of said storehouse along said modular racks, an inboard computer in interactivated relationship with said central computer for managing the movements and stoppages of said truck in said storehouse and controlling its movements, an inboard store structure consisting of an assembly of columns adapted to receive and hold in superposed relationship a plurality of order receiving bins, said motorized chassis comprising essentially:

a bin receiving platform adapted to carry at least one stock bin and/or one order receiving bin, said platform being movable at least linearly either in front of said racks of said storehouse or in front of at least one or said columns of said inboard store structure bin draw-out means adapted alternatively to transfer a unitary bin between said racks of said storehouse and said bin receiving platform, and to transfer an order receiving bin between said inboard store structure and said bin receiving platform, means for recentering said bin receiving platform so as to accurately position said draw-out means in both abscissa and ordinate in front of a bin disposed in said racks of said storehouse, and gripping means responsive to said inboard computer and adapted to pick-up one of the articles contained in said stock bin carried by said receiving platform for subsequently depositing said article into said order receiving bin.

2. The automated handling system of claim 1, wherein said bin receiving platform comprises:

an upper bin receiving platform proper secured to a platform translation carriage and provided with bin guide means for directing, and facilitating the positioning of, the stock bins and/or the order receiving bins during the transfer of the bins handled by said bin draw-out means.

a turret carriage comprising essentially a base plate rigid with said motorized chassis and a turret mounted for free swivel movement and guided by said base plate, said turret being provided with a guideway on which said platform translation carriage is adapted to travel.

said platform translation carriage secured to the bottom surface of said top platform comprising drive means for causing said bin receiving platform to move linearly at low speed in a direction defined by said guideway of said turret, drive means on said turret carriage for rotating said turret and consequently said bin receiving platform in relation to said base plate in order to cause said bin receiving platform to pivot in a horizontal plane for positioning said platform either in front of said stock bins contained in said modular racks of said storehouse or in front of the order receiving bins contained in said inboard store structure.

3. The automated handling system of claim 2, wherein said means for guiding the bins consist of a pair of guideways having a distance between centers corresponding substantially to the dimensions of the outer bottom of said stock bins or order receiving bins to be picked up, said guideways diverging preferably for facilitating the insertion of said bins between them.

4. The automated handling system of claim 2, wherein said top platform of said bin receiving platform comprises means for weighing the stock bin taken fromt eh storehouse and make a double weighing operation before and after the picking up of article in the bin in order to ascertain the actual concordance in weight between the picked-up article and the theoretical weight of the article preselected by said central computer and/or said inboard computer.

5. The automated handling system of claim 1, wherein said bin drawn-out means comprise a draw-out device guided and carried by said bin receiving platform, said draw-out device having means for detachably engaging and drawing out the bin to be handled, and means for impressing a longitudinal movement of translation to said device in relation to the medium axis of said platform for gripping the front lateral face of said stock bin or order receiving bin for drawing the selected bin out from either the stock store or from the inboard store structure, and causing the thus extracted bin to slip onto said bin receiving platform and/or push the extracted bin back into the stock store or the inboard store structure.

6. The automated handling system of claim 5, wherein said drawout device comprises tong-like extractor provided with a lazy-tong carried by a carrieage adapted to slide in a guide rail extending longitudinally with respect to the major axis of said bin receiving platform, said tonglike extractor being pivoted and off-set with respect to said guide rail to provide two axes of movement parallel to the major axis of said platform.

7. The automated handling system of claim 1, wherein said means for recentering said bin receiving platform comprise a sighting device for positioning said platform, said sighting device comprising at least one position sensor carried by said receiving platform and a relatively great number of reflectors carried by said racks in said storehouse and located exactly straight above each stock bin.

8. The automated handling system of claim 7, wherein said position sensors of said sighting device are arranged to deliver four output signals as a function of the four quadrants defined by two orthogonal abscissa and ordinate axes, said signals being completed by a signal denoting the presence of a reflector in front of said sighting device.

9. The automated handling system of claim 1, wherein said gripping means comprise a handling assembly consisting of a gripping head adapted to be lowered into the various bins for picking up selected articles therefrom, said head being mounted to a vertically movable support arm mounted in turn to a handling support cross-piece carried by the motorized chassis of said self-powered truck, said gripping head having a spiderlike configuration with radial arms provided at their outer ends with gripping tools consistent with the articles to be handled.

10. The automated handling system of claim 7, wherein said spiderlike gripping head is provided with a gripping device comprising cylindrical rollers and/or suction cups.

11. The automated handling system of claim 1, wherein said store structure consists of a swivel assembly detachably mounted to said self-powered truck and made of several columns of superposed order bins disposed at spaced angular intervals about the center of said structure, the store structure being adapted to be rotated by said drive means responsive to, and controlled by, said inboard computer so as to position the front face of the selected bin in front of said receiving platform at right angles to the direction of travel of said self-powered truck.

12. The automated handling system of claim 11, further comprising a station for mechanically packing the thus constituted customers' orders, and a number of interchangeable inboard store structures which is greater than the number of trucks utilized in the storehouse, wherein each inboard store structure is provided with exchange slideways permitting of transferring the store structure to said mechanical packing station and reequipping said self-powered truck with another empty store structure.

13. The automated handling system of claim 11, wherein said bin receiving platform comprises a bin code reader adapted to identify the bin to be picked up and to ascertain the actual concordance between the read bin and the bin to be handled which was preselected by said central computer and/or said inboard computer.

14. The automated handling system of claim 1, wherein the inboard computer provided on each self-powered truck comprises essentially:
a circuit for establishing an interactivation between the truck and said central computer of the system, notably for data transmission purposes,
a digital control circuit and a processing logic for controlling and checking the positions of said bin receiving platform,
a micro-calculator for controlling and guiding the movements of said motorized chassis along said lines of the storehouse,
a micro-computer for memorizing, in addition to the data concerning the specific job assigned to said self-powered truck, the configuration and plan of said storehouse, the configuration and equipment of said self-powered truck, the configuration of the store structure carried by said truck for controlling all the movements and planning the sequence of operative steps of said self-powered truck.

15. The automated handling system of claim 1, wherein said motorized chassis comprises:

a main structure of a width consistent with that of said lanes, said main structure being mounted on wheels driven by said translation means, a positioning aerial carried by said main structure for detecting and following said lanes in said storehouse, a rack code reader carried by said main structure for identifying the columns in the various racks and prepositioning the truck in front of the proper columns, a substantially vertical guide shaft rigid with said main structure and along which said bin receiving platform, said bin pick-up means and said article gripping means can move up and down, a digital height sensor consisting of a rod provided with a digitized scale extending throughout the height of said guide shaft, and of a scale reading coder adapted to deliver an electrical data as a function of the momentary level of said bin receiving table with respect to a predetermined reference level.

* * * * *